US006957706B2

(12) United States Patent
Burger et al.

(10) Patent No.: US 6,957,706 B2
(45) Date of Patent: Oct. 25, 2005

(54) ATTACHMENT MEMBER

(75) Inventors: Helmut Burger, Moorenweis (DE); Mathias Doberenz, Untermeitingen (DE); Thomas Naumann, Constance (DE)

(73) Assignee: Hilti Aktiengesellschaft, Schaan (LI)

(*) Notice: Subject to any disclaimer, the term of this patent is extended or adjusted under 35 U.S.C. 154(b) by 0 days.

(21) Appl. No.: 10/864,847

(22) Filed: Jun. 9, 2004

(65) Prior Publication Data

US 2004/0251039 A1 Dec. 16, 2004

(30) Foreign Application Priority Data

Jun. 12, 2003 (DE) ........................................ 103 26 472

(51) Int. Cl.[7] ................................................ B23B 45/00
(52) U.S. Cl. .......................... 173/169; 173/48; 173/217
(58) Field of Search .......................... 173/48, 169, 216, 173/217; 408/123, 234; 81/57.11, 57.13, 57.28, 57.29, 177.1, 177.85; 16/422, 426

(56) References Cited

U.S. PATENT DOCUMENTS 3,835,715 A * 9/1974 Howell ........................ 173/48
4,251,120 A * 2/1981 Wolff .......................... 384/252
5,056,607 A * 10/1991 Sanders ........................ 173/48
6,352,127 B1 * 3/2002 Yorde .......................... 173/216
6,550,545 B1 * 4/2003 Manschitz et al. ............ 173/48
2003/0066667 A1 * 4/2003 Zhang ........................ 173/217

FOREIGN PATENT DOCUMENTS

DE 10201895 A1 * 8/2002 ........... B25D/11/00

* cited by examiner

*Primary Examiner*—Stephen F. Gerrity
*Assistant Examiner*—Chukwarah Nathaniel
(74) *Attorney, Agent, or Firm*—Abelman, Frayne & Schwab

(57) ABSTRACT

An attachment member (4) for connecting a hand grip with a housing part and a gearbox of an electric hand tool is formed of a flat base plate (11) for partitioning the housing part and the gearbox relative to the hand grip and formed with a first side (12) and a second side (13). Two passages (6.1, 6.2) form channels for guiding a fastener and extend perpendicularly to the second side (13) of the base plate (11). The attachment member (4) further comprises two air conveying elements (15.1, 15.2), which are arranged at an angle to the second side (13) and each has a curved deflecting section (22.1, 22.2), which projects from the second side on a radius (R) over an angular range (α). In addition, the attachment member (4) has a support for a detent spring (24) for a control knob for adjusting a gearing arranged in the gearbox.

11 Claims, 4 Drawing Sheets

ATTACHMENT MEMBER

BACKGROUND OF THE INVENTION

1. Field of the Invention

The invention relates to an attachment member for fastening a hand grip to a housing part and a gear box of an electric hand tool. The attachment member has a flat base plate for closing off the housing part and the gearbox relative to the hand grip and having a first side and a second side. In addition, the attachment member has at least one passage for guiding a fastener, wherein the passage is aligned substantially perpendicular to the plane of the sides, and extends from the first side and/or the second side of the base plate.

2. Background of the Invention

When manufacturing electric hand tools such as drill hammers, chisel hammers, grinding tools, and the like, the individual components are assembled into modules or into component groups in separate production steps. The individual assemblies are assembled in a further production step and connected by means of bolts. In the case of a drill hammer, for example, the housing part has a striking mechanism, which has a gearbox, a transmission mechanism and the hand grip has a actuating means such as a switch. The motor of the electric hand tool is arranged on the gearbox. During operation, the cool air current generated by the motor or by using a fan is employed also for cooling the striking mechanism and is conconveyed past the gearbox housing to the striking mechanism. When this is done, the air current should not circulate in the hand grip and the user should not have his work impaired when using the electric hand tool by the air current issuing from the electrical assembly. To assure the guiding of the air current in the prior art solutions, a plurality of elements have been provided for compartmentalizing and diverting within the electric hand tool, which are individually assembled and fastened.

For compartmentalizing the hand grip vis-à-vis the housing part or the gearbox a base plate, for example, is provided, which in addition has passages for guiding the fastener. For reducing the length and the stresses on the fastener, hollow cylindrical domes are provided arranged perpendicular to the plane of the base plate. After or during the assembly of the housing part with the hand grip, an additional element is arranged in the assembly region for diverting the air current from the housing part. In part, therefore, additional channels must be provided on the base plate or on sections of the individual parts of the housing, for example, for fastening the gearbox.

In addition, for the gearing arranged in the gearbox a control knob is provided on the outside of the electric hand tool, by means of which the desired translation or function of the electric hand tool can be adjusted by the user. For securing the control knob in the desired position, a detent spring is threaded of the gearbox, generally of the individual assemblies, after preliminary assembly of the control lever of the gearing using its collar by means of an auxiliary tool or hand tool.

The drawback of the prior art is that for connecting the individual assemblies, a plurality of individual elements must be used, which result in a high logistical expense and high tool costs for their manufacture. In addition, the prior art solutions for making possible the assembly of the individual components and elements require considerable space, which has a negative affect on the overall dimensions of the electric hand tool.

SUMMARY OF THE INVENTION

The object of the invention is to provide a attachment member, which is structurally compact and consequently facilitates installation. In addition, the attachment member must be simple and economical to manufacture.

According to the invention, the attachment member comprises at least one air conveying element arranged at an angle to the second side of the base plate and has at least one deflecting section, which projects at a radius over an angular range from the second side. In addition, the attachment member has at least one support for a detent spring for a control knob for adjusting gearing arranged in the gearbox.

The arrangement of the at least one air conveying element on the second side of the base plate makes possible the compact structure of the attachment member. No additional part must be provided and, for example, attached to the base plate or to a housing for guiding the air current. The extent of the angular range and of the radius is determined by the inside dimensions of the electric hand tool and the dimensions and layout of the individual assemblies adjacent to the fastening element. The radius preferably has a constant value over the entire angular range. In an alternative version thereof, the value of the radius can vary over the angular range, so that the at least one deflecting section of the air conveying element describes an elliptical course.

The attachment member according to the invention further has a support for the detent spring, wherein the spring is securely mounted prior to the incorporation of the attachment member. In addition, the detent spring is preferably pre-stressed after insertion into the receptacle. No special tool is required for installing the spring, because the detent spring is simply inserted into the receptacle; pressed or compressed therein. The passages are preferably arranged in channels, whose dimensions are preferably optimized, so that for connecting the individual assemblies only one type of fastener is used; for example, only one type of bolt. The alignment of the at least one passage in the channel preferably runs in or parallel to the longitudinal axis of the channel.

The attachment member is available as a separate assembly for assembly of the electric hand tool, whereby, for example, inspection for the correct installation of the detent spring is facilitated and the dimensions of this assembly are reduced compared to the prior art designs having individual loose elements that must be assembled in several steps. Furthermore, using the attachment member according to the invention, the repair and service friendliness of the electrical hand tool is enhanced. For example, the thread on the channels is exposed to a certain wear phenomenon with each dismantling and assembly of the electric hand tool. If the attachment member is damaged, the economically manufactured attachment member is replaced at the time of repair or service. Because the attachment member combines several functions, lower storage costs are incurred in comparison to the prior art solutions having several separate parts and the risk of mixing up the different parts is prevented when dismantling or assembling—for example, at the time of repair and service work and manufacturing the electric hand tool. In addition, with the attachment member according to the invention means on the housings of the individual components for fastening the air conveying elements or receptacles for the detent springs are eliminated.

Preferably, the angular range ($\alpha$) of the at least one deflecting section of the at least one air conveying element includes a range of from 50° to 90°, preferably from 65° to 80°. The air current produced by a fan or by a motor is conveyed in this embodiment of the attachment member through the entire electric hand tool, without the air current circulating in the hand grip. The selected angle of the angular range is dependent primarily on the orientation of the individual components relative to each other and on the available dimensions of the electric hand tool.

Preferably at least one rectilinear segment is connected to the free end of the at least one air conveying element. In this form, the air conveying element can be compactly shaped while allowing optimum guidance of the air current. Relative to the overall air conveying element, the pronouncedly expanding angular range is limited to the required minimum. The rectilinear section preferably covers the region between the end of the arcuate section of the air conveying element up to a delimiting partition.

Advantageously, at least one opening is provided in the rectilinear section or on the deflecting section of the air conveying element. Control elements such as a magnetic lever, for example, can be passed through the opening from the hand grip to the gearbox or the housing part.

Preferably the attachment member has a clip-on mechanism for attaching the attachment member to the gearbox. In this fashion, assembly is simplified appreciably. The attachment member is affixed to the gearbox prior to assembly of the individual components and then the individual components are connected to each other by threaded fasteners, for example. The clip-on mechanism has, for example, cams on the gearbox, which engage in recesses on the attachment member corresponding to the cams. In an alternative thereto, the gearbox is provided with depressions, into which the projecting cams engage on the attachment member.

Preferably, the receptacle for the detent spring is substantially arcuate and oriented substantially perpendicular to the plane, which extends from the first side and/or the second side of the base plate. By means of the arcuate shape of the receptacle, a precise arrangement of the detent spring is possible. The ends of the detent spring are preferably shaped in such a fashion, that they are held in the free ends of the arcuate shape. In a common arrangement of the individual components relative to each other with the receptacle oriented substantially perpendicular to the plane of the base plate, the arrangement of the control knob is possible on the side of the electric hand tool, which allows a high degree of operating comfort of the control knob.

The arcuate receptacle preferably abuts, at least in regions, on the at least one arcuate section of the air conveying element. In this fashion, a compact embodiment of the attachment member is provided.

If at least one part of the arcuate support is formed at least in regions by the deflecting section of the air conveying element, the result is an even more compact embodiment of the attachment member.

Preferably the attachment member is made of a plastics material and manufactured in particular in an injection molding procedure. By virtue of the combination of a plurality of functional elements into one attachment member, only one tool is required for manufacturing the attachment member. In this fashion, the attachment member according to the invention can be manufactured essentially more advantageously and economically than was possible in the case of the previous embodiments.

Other advantageous embodiments and combinations of features of the invention will become apparent from the following detailed description and the set of patent claims.

BRIEF DESCRIPTION OF THE DRAWING

The invention will be more completely explained using two exemplary embodiments. Wherein.

DETAILED DESCRIPTION OF THE INVENTION

Figure 1:
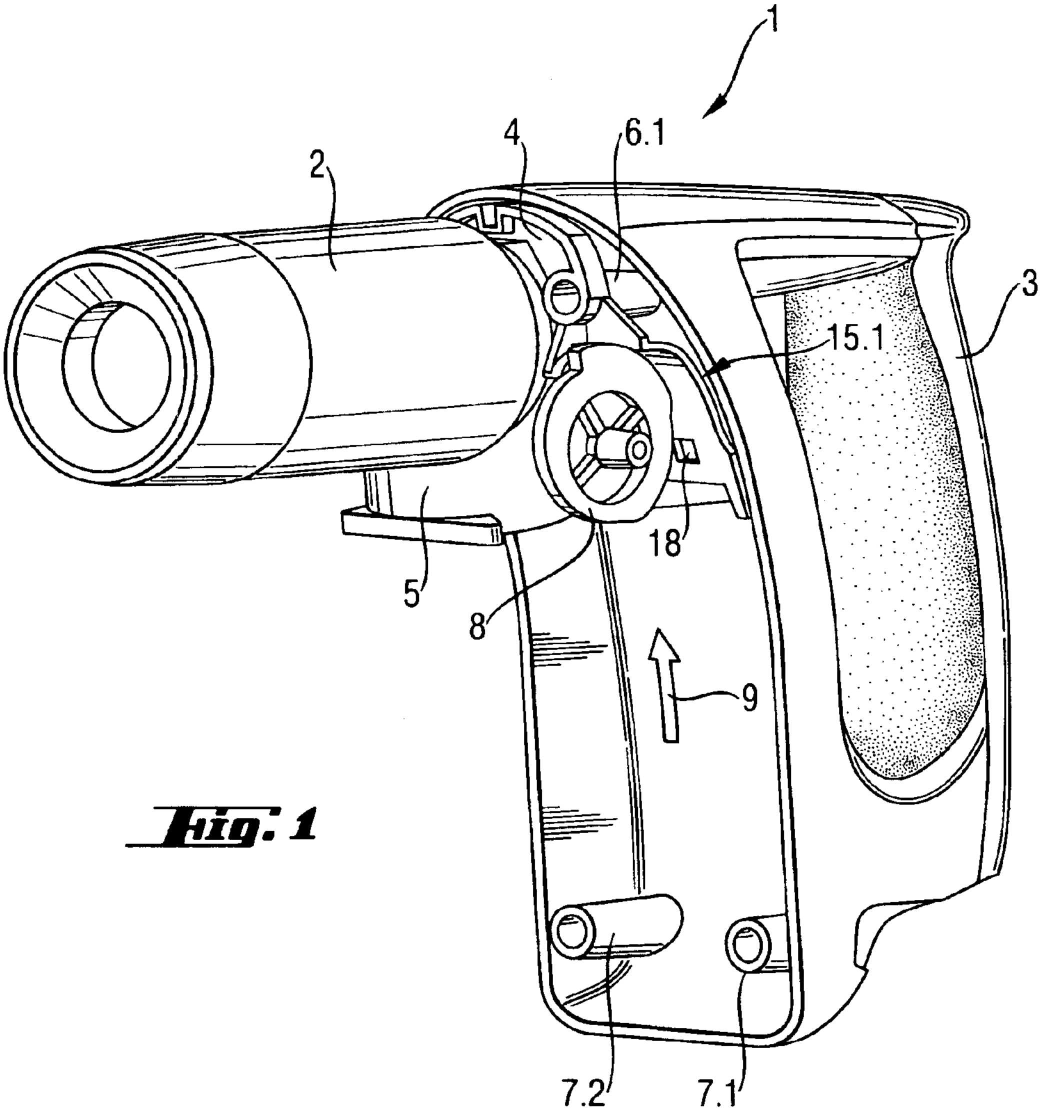
FIG. 1 represents exterior and lateral perspective views of a part of the electric hand tool having a first exemplary embodiment of the attachment member according to the invention.
Figure 2:
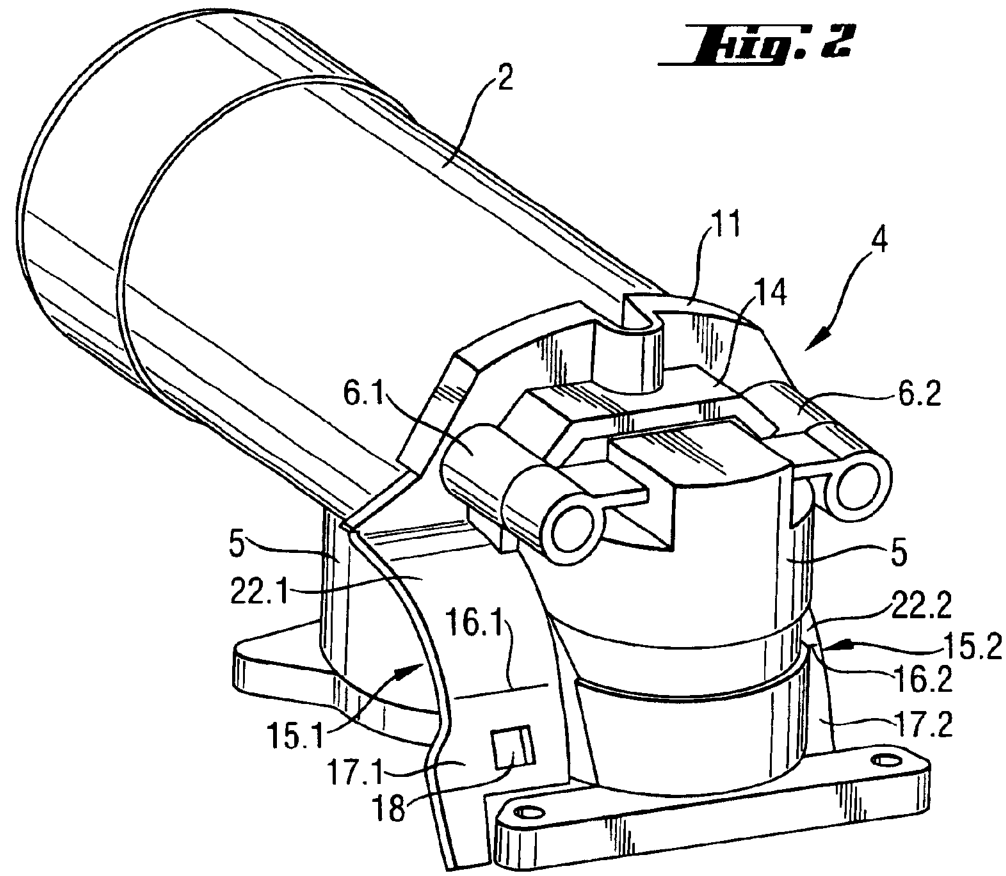
FIG. 2 represents another perspective view of the attachment member represented in FIG. 1 and a housing part of the hammer drill.

FIG. 1 and FIG. 2 each represent a perspective view from two different angles of a part of the electric hand tool having a first exemplary embodiment of the attachment member according to the invention. For the purpose of clarification of the invention only the relevant assemblies of the electric hand tool—in this instance, a hammer drill—are represented. The attachment member 4 according the invention, which was previously clipped on the gearbox 5, is arranged between the housing part 2 and the hand grip 3. The channels 6.1 and 6.2 on the attachment member 4 are shaped in such a fashion, that the same bolts can be used through these as well as through the channels 7.1 and 7.2 for connecting the individual assemblies with each other. Moreover, in the perspective views according to FIG. 1 the control knob 8 is represented arranged laterally on the hammer drill 1 for setting the different functions of the hammer drill 1. An air current generated by a motor (not shown) and moving in the direction of the arrow 9 is diverted by the attachment member 4 in the direction of the housing part 2, without the air current being capable of circulating in the hand grip 3.

Figure 3:
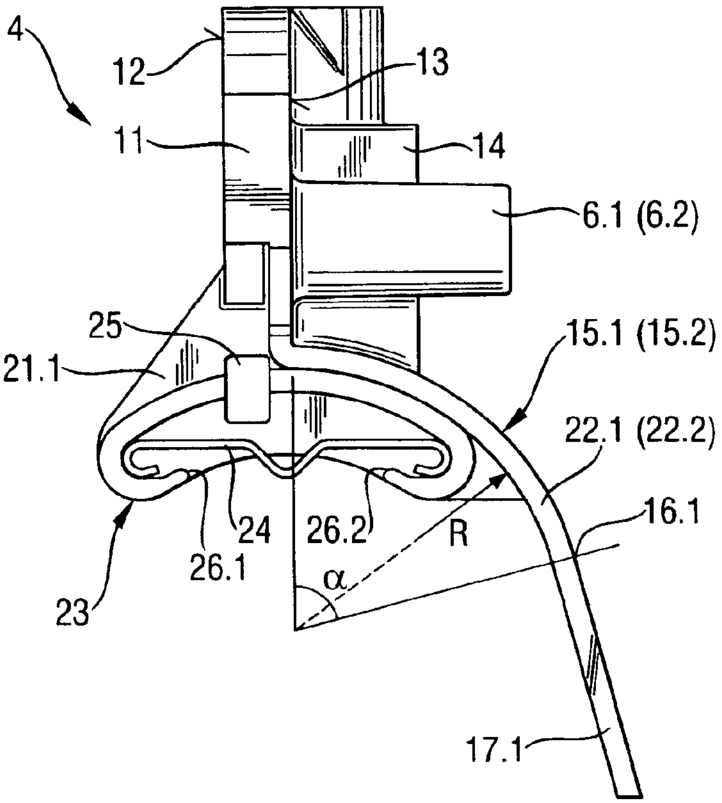
FIG. 3 represents a lateral view of the first exemplary embodiment of the attachment member according to the invention.
Figure 4:
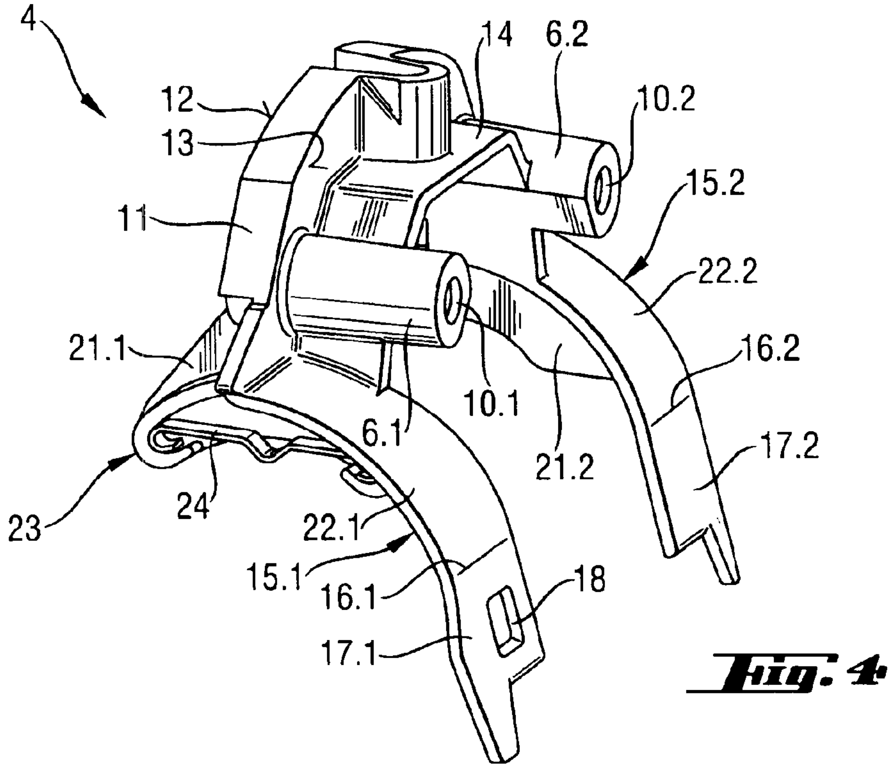
FIG. 4 represents a perspective view of the attachment member represented in FIG. 3.

The attachment member 4, as can be seen especially in FIG. 3 and FIG. 4, comprises a base plate 11 with a flat or planar first side 12 and a a flat or planar second side 13. The channels 6.1 and 6.2 extend from the second side of the base plate 11 perpendicular to the plane of the second side 13. The channels 6.1 and 6.2 have a hollow cylindrical form and each has internally a passage 10.1, 10.2 with a thread for receiving the bolts (not shown). In addition, the attachment member 4 has a projection 14 serving as a reinforcement and assembly aid, which contacts the member and partially includes it after mounting on the gearbox 5.

Two air conveying elements 15.1 and 15.2 project from the second side 13 of the base plate 11, the elements laterally enclose the attachment member 4 in its mounted condition on the gearbox 5. The air conveying elements 15.1 and 15.2 each have a curved deflecting section 22.1 or 22.2, each of which extends over an angular range ($\alpha$) of 75° in a constant radius R. A rectilinear section 17.1 or 17.2 connects at the end 16.1 or 16.2 of the deflecting sections 22.1, 22.2 of the air conveying elements 15.1 and 15.2. The rectilinear section 17.1 is provided with a passage 18 for a magnetic lever, which is passed through the passage 18 after assembly of all components of the hammer drill 1.

Reinforcements 21.1 and 21.2 are formed laterally and perpendicular to the planes of the sides of the base plate 11. On each of the reinforcements 21.1 and 21.2 an opening 25 is provided as a complementary latching means for a cam arranged on the gearbox 5 and shaped as a latching means. The latching means and the complementary latching means together form the clip mechanism for affixing the attachment member 4 to the gearbox 5. In addition, an arcuate support 23 is provided on the reinforcement 21.1 for receiving a detent spring 24, which abuts the deflecting section 22.1 of the air conveying element 15.1 or rests upon the deflecting section 22.1 The arcuate support 23 is interrupted in this exemplary embodiment by the passage 25. Each free end 26.1 and 26.2 of the support 23 forms a hook, in which one end of the detent spring 24 is securely held after insertion into the support 23. By virtue of the shape of the detent spring 24, it is pre-stressed in its installed condition. In this fashion, the detent spring 24 can be inserted into the support 23 and its seating controlled prior to affixing the attachment member 4 to the gearbox 5 and assembly of the individual components of the hammer drill 1.

Figure 5:
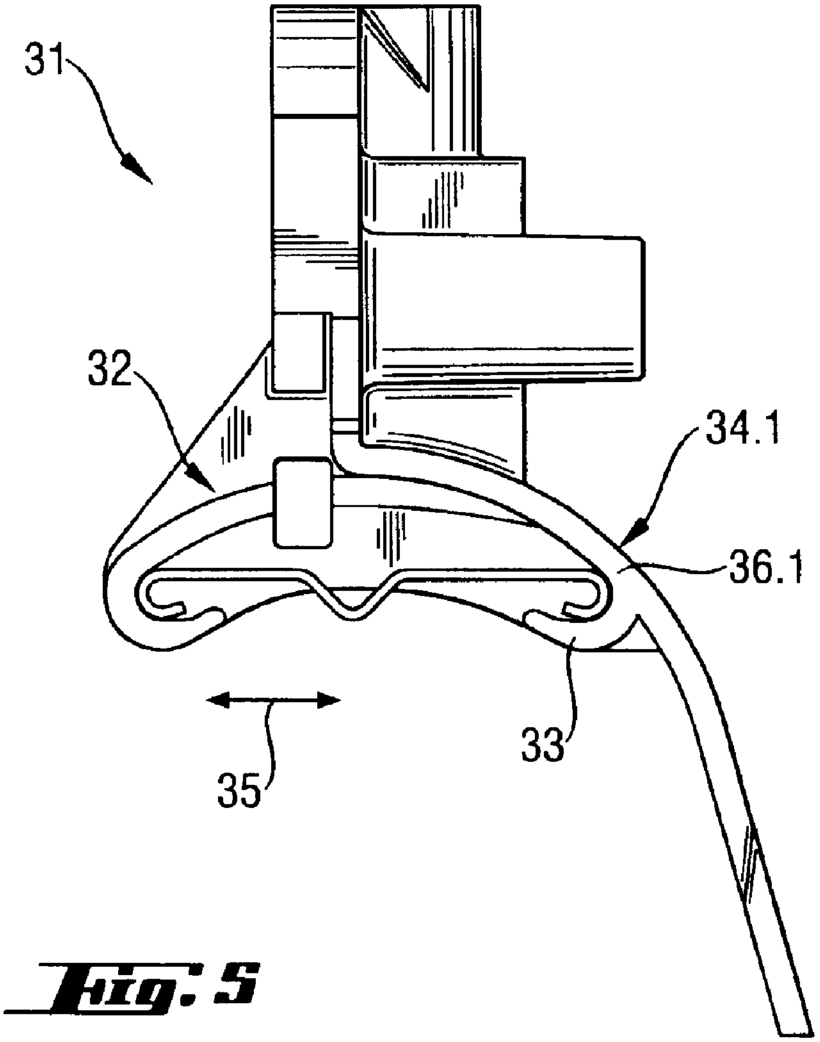
FIG. 5 represents a lateral view of a second exemplary embodiment of the attachment member according to the invention. In principle, in the figures identical parts are identified using identical reference numerals.

A side view of the second exemplary embodiment of the attachment member according to the invention is represented in FIG. 5. The attachment member 31 is identical, with the exception of the shape of the support 32, to the first exemplary embodiment of the attachment member 4 according to the invention described in FIGS. 1 to 4.

One free end 33 of the arcuate support 32 is formed directly on the deflecting section 36.1 of the air conveying element 34.1, whereby the arcuate support 32 of the attachment member 31 can be shaped shorter in the direction of the double arrow 35 than the arcuate support 23 of the attachment member 4.

It should be remarked in summary, that the attachment member according to the invention simplifies the assembly of the electric hand tool and reduces the costs of its manufacture and its logistics compared to the solutions of the prior art. In addition, the repair and service friendliness of the electric hand tool is improved appreciably with the attachment member according to the invention.

What is claimed is:

1. An attachment member (4, 31) for use in an electric hand tool for connecting a hand grip (3) of the tool to a housing part (2) and gearbox (5) of the tool, the attachment member comprising a flat plate (11) for partitioning the housing part (2) and the gearbox (5) relative to the hand grip (3), and having a planar first side (12) facing the housing part (2) and a planar second side (13) facing the hand grip (3), and at least one passage (10.1, 10.2) extending through said base plate substantially perpendicular to said first and second sides (12, 13) for receiving a fastening element; at least one air conveying element (15.1; 15.2; 34.1) extending at an angle to said second side (13), and having at least one deflection circular section (22.1; 22.2) having a radius (R) and projecting from said second side (13) over an angle range ($\alpha$); and at least one support (23, 32) for supporting a detent spring (24) of a control knob (8) for adjusting a gear transmission located in the gearbox (5).

2. An attachment member, as set forth in claim 1, wherein said at least one air conveying element (15.1, 15.2, 34.1) has a rectilinear section (17.1, 17.2) connected to and extending from an end of said deflecting section (22.1, 22.2) spaced from said base plate (11).

3. An attachment member, as set forth in claim 2, wherein at least one passage (18) is provided through at least one of said rectilinear section and said deflecting section at least one of said air conveying element (15.1, 15.2).

4. An attachment member, as set forth in claim 1, wherein said attachment member (4, 31) has a clip mechanism for fixing said attachment member (4, 31) to said gearbox (5).

5. An attachment member, as set forth in claim 1, wherein said support (23, 32) for said detent spring (24) is substantially arcuate and is arranged essentially perpendicular to at least one of said first and second sides (12, 13) of said base plate (11).

6. An attachment member, as set forth in claim 5, wherein said arcuate support (23, 32) contacts at least regions of said support (23, 32) for said air conveying element (15.1, 34.1).

7. An attachment member, as set forth in claim 5, wherein at least one part of said support (32) is formed by at least a region of said deflecting section (36.1) of said air conveying element (34.1).

8. An attachment member, as set forth in claim 1, wherein said attachment member (4, 31) is formed of a plastics material.

9. An attachment member, as set forth in claim 8, wherein said attachment member (4, 31) is manufactured by an injection molding process.

10. An attachment member according to claim 1, wherein said angular range ($\alpha$) amounts to from 50° and 95°.

11. An attachment member, as set forth in claim 1, wherein said angular range ($\alpha$) is 65° to 80°.

* * * * *